(12) United States Patent
Moridis et al.

(10) Patent No.: US 6,250,848 B1
(45) Date of Patent: Jun. 26, 2001

(54) PROCESS FOR GUIDANCE, CONTAINMENT, TREATMENT, AND IMAGING IN A SUBSURFACE ENVIRONMENT UTILIZING FERRO-FLUIDS

(75) Inventors: George J. Moridis, Oakland; Curtis M. Oldenburg, Mill Valley, both of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/345,427

(22) Filed: Jul. 1, 1999

Related U.S. Application Data (60) Provisional application No. 60/118,315, filed on Feb. 1, 1999.

(51) Int. Cl.[7] .............................. E02D 3/12; E21B 33/138
(52) U.S. Cl. ..................... 405/263; 166/66.5; 166/292; 405/266; 405/270
(58) Field of Search ................................... 405/128, 263, 405/264, 266, 267, 270; 166/245, 292, 294, 66.5; 588/259

(56) References Cited

U.S. PATENT DOCUMENTS

| | | | |
|---|---|---|---|
| 2,279,262 | * 4/1942 | Edwards | 166/292 X |
| 2,696,260 | * 12/1954 | Fast | 166/66.5 |
| 3,300,984 | * 1/1967 | Armentrout | 405/263 |
| 4,691,774 | * 9/1987 | Nelson | 166/291 |
| 4,802,534 | * 2/1989 | Larson et al. | 166/381 |
| 5,465,789 | * 11/1995 | Evans | 166/66.5 X |
| 5,836,390 | * 11/1998 | Apps et al. | 405/263 X |

\* cited by examiner

*Primary Examiner*—George Suchfield
(74) *Attorney, Agent, or Firm*—Charles R. Nold; David J. Aston; Henry P. Sartorio (57) ABSTRACT

Disclosed are processes for monitoring and control of underground contamination, which involve the application of ferrofluids. Two broad uses of ferrofluids are described: (1) to control liquid movement by the application of strong external magnetic fields; and (2) to image liquids by standard geophysical methods.

7 Claims, 5 Drawing Sheets

PROCESS FOR GUIDANCE, CONTAINMENT, TREATMENT, AND IMAGING IN A SUBSURFACE ENVIRONMENT UTILIZING FERRO-FLUIDS

This application claims priority from Provisional Application No. 60/118,315, filed Feb. 1, 1999.

ACKNOWLEDGEMENT

This work was supported by the Laboratory Directed Research and Development Program of Lawrence Berkeley National Laboratory under the U.S. Department of Energy, Contract No. DE-AC03-76SF00098. The U.S. Government has certain rights to the invention.

BACKGROUND OF THE INVENTION

1. Field of the Invention

The present invention relates to a process for guidance, containment, treatment and imaging of contaminants and other substances in a subsurface environment, utilizing ferrofluids.

Ferrofluids are stable colloidal suspensions of ferromagnetic particles in carrier liquids. The solid, single-domain magnetite particles have an average diameter of 10 nm and are covered with a molecular layer of dispersant. Brownian motion keeps the particles suspended, while the dispersant coating prevents the particles from agglomerating. The stability of ferrofluids means that neither external magnetic fields nor gravity can significantly change the concentration of the magnetic particles in the carrier liquid. Consequently, ferrofluids move as a homogeneous pseudo-single-phase fluid when flowing under the influence of a magnetic field. This attribute is responsible for the unique property of ferrofluids enabling them to be manipulated through the application of external magnetic fields in virtually any fashion defying gravitational or viscous forces. Therefore, ferrofluids can be made to flow in a desired direction and move precisely without any physical contact. Additionally, ferrofluids cast a strong magnetic signature through their distinct magnetic and electrical resistance properties.

2. The Relevant Art

Due to their ability to be held in place by magnetic fields, ferrofluids currently find application in a variety of products, including (a) hermetic seal pumps, where ferrofluids are used to eliminate leakage along rotating shafts and joints, (b) rotating vacuum seals used in semiconductor processing and environmentally controlled chambers, and (c) high-fidelity audio speakers and precision bearings. The biomedical field has exploited ferrofluids for use in (a) tracing blood flow in non-invasive circulatory measurements, and (b) transporting therapeutic agents incorporated onto the magnetic particles, which are then guided by magnetic fields to specific body sites. A detailed treatment of ferrofluid physics can be found in Rosensweig (1985), while more applied aspects are discussed in Raj and Moskowitz (1990), Berkovski et al. (1993), and Berkovski and Bashtovoy (1996), references listed in the Relevant Art section infra.

REFERENCES

The following literature references are known by the inventors to be concerned with various aspects of the characteristics and uses of ferrofluids.

Berkovski, B., and V. Bashtovoy, *Magnetic Fluids and Applications Handbook,* Begell House, Inc., New York, 1996.

Berkovski, B. M., V. F Medvedev, M. S. Krakov, *Magnetic Fluids Engineering Applications,* Oxford Univ. Press, New York, 243 pp., 1993.

Bailey, R. L., Lesser known applications of ferrofluids, *J. Magnetism Magnetic Mater.,* 39(1,2), 178–182, 1983.

Borglin, S. E., G. J. Moridis, and C. M. Oldenburg, Experimental studies of magnetically driven flow of ferrofluids through porous media, *Lawrence Berkeley National Laboratory Report* LBL-40126, Berkeley, Calif., March 1998a.

Borglin, S. E., G. J. Moridis, and A. Becker, Magnetic detection of ferrofluid injection zones, *Lawrence Berkeley National Laboratory Report* LBL-40127, Berkeley, Calif., March 1998b.

Chorney, A. F., and W. Mraz, Hermetic sealing with magnetic fluids, *Machine Design,* 79–82, May 1992.

Jackson, J. D., *Classical Electrodynamics,* John Wiley & Sons, New York, 641 pp., 1967, pg. 153–154.

Lunn, S. R. D., B. H. Kueper, Removal of pooled dense, nonaqueous phase liquid from saturated porous media using upward gradient alcohol floods, *Water Resour. Res.,* 33(10), 2207–2219, 1997.

Moridis, G. J., S. E. Borglin, C. M. Oldenburg, and A. Becker, Theoretical and experimental investigations of ferrofluids for guiding and detecting liquids in the subsurface, *Lawrence Berkeley National Laboratory Report* LBL-41069, Berkeley, Calif., March, 1998.

Moridis, G. J., L. Myer, P. Persoff, S. Finsterle, J. A. Apps, D. Vasco, S. Muller, P. Yen, P. Williams, B. Freifeld, and K. Pruess, First-Level Field Demonstration of Subsurface Barrier Technology Using Viscous Liquids, *Lawrence Berkeley National Laboratory Report* LBL-37520, Berkeley, Calif., July 1995.

Morimoto, Y., Magnetic guidance of ferro-colloid entrapped emulsion for site-specific drug delivery, *Chemical and Pharmaceutical Bulletin* (Tokyo), 48, 1279–1284, 1983.

Moskowitz, R., Dynamic sealing with magnetic fluids, *ASLE Transactions,* 18(2), 135–143, 1975.

Newbower, R. S., A new technique for circulatory measurements employing magnetic fluid tracers, in *Proceedings,* 1972 *Biomedical Symp.,* San Diego, 1972.

Oldenburg, C. M., S. E. Borglin, and G. J. Moridis, Numerical simulation of ferrofluid flow for environmental engineering applications, *Lawrence Berkeley National Laboratory Report* LBNL-40146, March 1998 and *Transport in Porous Media,* in press.

Raj, K., and R. Moskowitz, Commercial applications of ferrofluids, *J. of Magnetism and Magnetic Materials,* 85, 233–245, 1990.

Rao, P. S. C., M. D. Annable, R. K. Sillan, D. Dai, K. Hatfield, W. D. Graham, A. L. Wood, and C. G. Enfield, Field-scale evaluation of in situ cosolvent flushing for enhanced aquifer remediation, *Water Resour. Res.,* 33(12), 2673–2686, 1997.

Rosensweig, R. E., *Ferrohydrodynamics,* Cambridge University Press, 344 pp., 1985.

Senyei, A. E., and K. Widder, Drug targeting: Magnetically responsive albumin microspheres- A review of the system to date, *Gynecology and Oncology,* 12(1), 21–33, 1981.

Telford, W. M., L. P. Geldart, and R. E. Sheriff, *Applied Geophysics,* 2nd Edition, Cambridge University Press, 1990.

U.S. Pat. No. 5,836,390, issued Nov. 11, 1998.

BRIEF SUMMARY OF THE INVENTION

The invention comprises a process having a number of embodiments for utilizing ferrofluids in the field of environmental engineering with emphasis on subsurface environmental restoration. The various embodiments fall broadly into two main categories: (1) guiding liquids and holding liquids in place in the subsurface through application of magnetic fields; and (2) using ferrofluids as tracers imageable by standard electromagnetic and geophysical methods. The invention, therefore, is a process for guidance, containment, treatment and imaging of below ground substances, such as contaminants, utilizing ferrofluids. The invention is described more fully herein.

BRIEF DESCRIPTION OF THE DRAWINGS

In this description of the invention, reference will be made to the accompanying figures and drawings, in which.

DETAILED DESCRIPTION OF THE INVENTION

General Characteristics of Ferrofluids

Ferrofluids are dark colored, opaque fluid mixtures of carrier liquid, colloidal magnetite particles, and dispersant. Ferrofluids can be made with a variety of carrier liquids, including oil-, alcohol-, and water-based liquids. Given strict regulatory requirements for injecting fluids underground, water-based ferrofluids are the preferred fluids for underground applications, with a notable exception being alcohol-based ferrofluids and their potential applicability to special NAPL (non aqueous phase liquid) removal methods. The colloidal magnetite particles have an average size of 10 nm, and are formed through either size reduction (grinding) or precipitation processes. The dispersants are polymeric molecules that attach to the magnetite particles to prevent agglomeration and settling. The properties of ferrofluid that are most relevant to environmental engineering applications are magnetization, density, and viscosity. These properties are shown in Table 1 for a water-based ferrofluid, EMG 805, the preferred ferrofluid for use in the process of the invention. This ferrofluid is manufactured by the Ferrofluidics Corporation, 40 Simon Street, Nashua, N.H. 03061.

TABLE 1

Properties of ferrofluid EMG 805 ™ at 20° C.

| Property | Symbol | Value |
|---|---|---|
| saturation magnetization | $M_{sat}$ | $1.59 \times 10^4$ A m$^{-1}$ |
| density | $\rho$ | 1190 kg m$^{-3}$ |
| viscosity | $\mu$ | $2.35 \times 10^{-3}$ kg m$^{-1}$ s$^{-1}$ |

Data Provided by Ferrofluidics Corporation (Nahua, N.H.)

Other ferrofluids which can be used in the process of the invention include water based solutions of the EMG 800 series, sold by the Ferrofluidics Corp. of Nashua, NH., specifically EMG 807, and oil based fluids of the 900 series, specifically EMG 900, 901, and 911.

The water based ferrofluids preferably have saturation magnetization values ranging from about 0.01 to about 0.02 tesla (100 to 200 gauss). The oil based fluids preferably have saturation values ranging from about 0.01 to about 0.06 tesla (100 to 600 gauss).

Water based ferrofluids are preferred, however, because of environmental concerns.

Magnetization

Magnetization is the result of a ferromagnetic material becoming polarized in the presence of an external magnetic field. As the strength of an external magnetic field increases from zero A/m, ferrofluid becomes magnetized to a degree controlled by the magnetic field strength and the properties of the ferrofluid. The relationship between the magnetic induction or magnetic flux density (B), and magnetic field strength (H), and magnetization (ii) is known generally as the B-H curve where $$B = \mu_o(H+M) \tag{1}$$

where $\mu_o$ is the magnetic permeability of free space ($\mu_o = 4\pi \times 10^{-7}$ T m A$^{-1}$). (In this application, the term permeability refers to hydraulic permeability [m$^2$], which is to be distinguished from the magnetic permeability [T m A$^{-1}$] of Eq. 1). Eq. 1 has been written in terms of the vectors B, H, and M, but can also be written as a scalar equation where B, H, and M are scalars representing vector magnitudes. As the external magnetic field is increased, the ferrofluid reaches a maximum magnetization, or saturation magnetization. Thus the magnetization is a function (f) of H whose parameters depend on the particular type of ferromagnetic material (e.g., Jackson, 1967):

$$M = f(H) \tag{2}$$

The significance of the magnetization is that it interacts with the magnetic field to produce a body force on ferrofluid. The attractive force on ferrofluid per unit volume is given by $$F = \mu_o M \nabla H \tag{3}$$

(Rosensweig, 1985) where units in MKS for the terms in Eq. 3 are as follows:

$$\frac{N}{m^3}[=]\frac{Tm}{A}\frac{A}{m}\frac{A}{m^2}[=]\frac{TAm}{m^3}. \tag{4}$$

Regardless of the location and orientation of the magnet, ferrofluid is always attracted toward a magnet.

Figure 1:
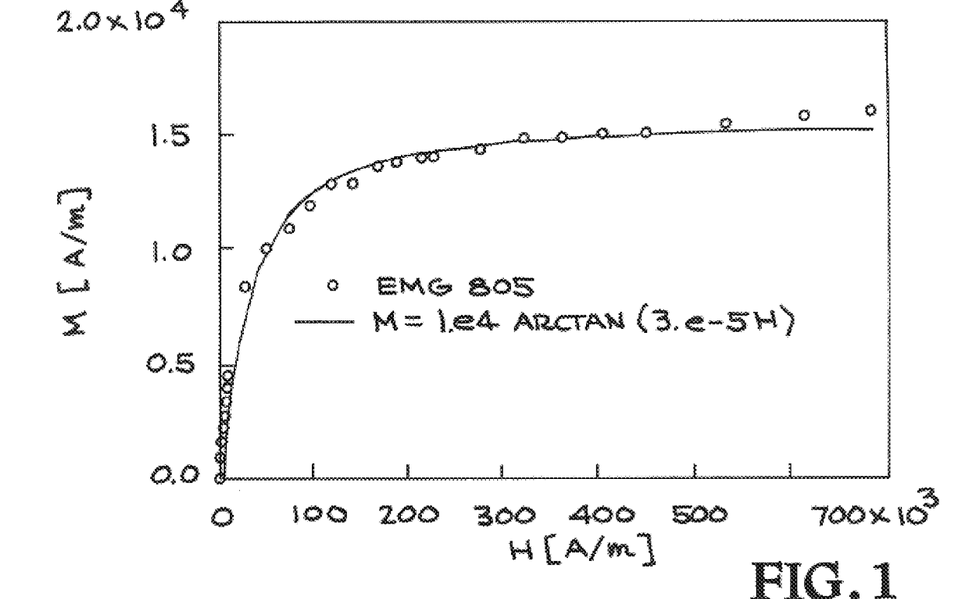
FIG. 1. Graph illustrating the magnetization curve for ferrofluid EMG 805.

An example magnetization curve is shown in FIG. 1 where data (shown by the symbols) are presented for the pure ferrofluid EMG 805™ (Ferrofluidics Inc., Nashua N.H.). The full B-H curve for the material would be formed by multiplying M by $\mu_o$ and adding the linear $\mu_o$ H term of Eq. 1. Ferrofluid EMG 805™ is sometimes referred to as a 200 gauss ferrofluid because the saturation magnetization ($M_{sat}=1.59\times10^4$ A/m) multiplied by $\mu_o$ is approximately 200 gauss (i.e., $1.59\times10^4$ A/m$\times 4\pi\times10^{-7}$ T m/A$\times 1\times10^4$ gauss/T$\approx$200 gauss). The curve of FIG. 1 is indicative of a soft magnetic material because it attains magnetization easily and reaches saturation at relatively low magnetic field strength. Soft magnetic materials also lose magnetization quickly as the external field diminishes, in contrast with permanent magnets (hard magnetic materials) which are slow to magnetize but retain their magnetization for long periods after the external magnetic field is removed. Ferrofluids will always be attracted toward a magnet regardless of the orientation of the magnetic poles.

The slope of the magnetization curve at low values of H defines the initial magnetic susceptibility of the ferrofluid. The initial magnetic susceptibility of ferrofluid is sufficiently large that it will be magnetized slightly by the earth's magnetic field, and thereby be detectable by measuring variation in the earth's magnetic field near the body of ferrofluid. The methods of detection of such magnetic anomalies are well established. Similarly, the magnetite in ferrofluid has higher electrical conductivity than typical sediment, soil, and rock and thereby creates a resistivity anomaly that can also be detected by standard geophysical methods. These properties of ferrofluid allow it to be used as an imageable subsurface tracer, applications of which will be presented herein.

Density and Viscosity

Since the aqueous ferrofluid (EMG 805™) is a mixture of colloidal sized magnetite particles and water, its density and viscosity are larger than those of water (see Table 1). Ferrofluid EMG 805™ contains approximately 4% magnetite by volume, 8% dispersant, and 88% water. A cubic meter of ferrofluid contains approximately $10^{23}$ particles of magnetite. The density of pure EMG 805™ is 1190 kg m$^{-3}$, similar to that of a salt-water solution near saturation. Despite the presence of magnetite particles and dispersant, the viscosity of EMG 805™ is a mere 2.35 times greater than that of water at room temperature. Thus, the viscosity of ferrofluids does not change with the strength of the external magnetic field. Although the aqueous ferrofluid EMG 805™ is slightly denser and more viscous than water, it has been observed in numerous laboratory experiments that it flows through sand similarly to water (Borglin et al., 1998a).

The fundamental problems encountered in environmental engineering are largely due to (1) the inaccessibility of the subsurface, (2) the heterogeneity of the subsurface and the difficulty of characterizing it, and (3) the risk of causing uncontrolled contaminant migration during the remediation activity that aggravates the original contamination problem. The unique properties of ferrofluids that they can be (1) manipulated by magnetic fields and (2) imaged by geophysical methods give great potential for overcoming these fundamental problems. For example, because ferrofluids are attracted toward magnets, it is possible to guide ferrofluid through the subsurface by strategic emplacement of magnets, for example downhole in boreholes. For sediments with non zero permeability, the final distribution of ferrofluid around a magnet is independent of the local permeability field. Where contaminants can be partitioned into the ferrofluid itself, enhanced extraction efficiency can be potentially accomplished by application of magnetic fields. These and other applications will be described further below.

Several embodiments of the process of this invention utilizing ferrofluids for monitoring and control of subsurface contaminants are summarized in Table 2. As shown, the process embodiments involving the use of ferrofluids fall into two main classes: (1) control of liquid movement; and (2) imaging of liquids by geophysical methods. The process embodiments shown in Table 2 are described in more detail in the examples that follow.

TABLE 2

Ferrofluid applications in environmental engineering.

| Liquid Control (applied magnetic field produces forces on ferrofluid) | Liquid Imaging (ferrofluid produces magnetic and electrical resistivity anomalies) |
| --- | --- |
| guiding liquids in subsurface sealing underground tanks subsurface barrier emplacement recovering spilled liquid | imaging subsurface fluid flow barrier imaging and verification Imaging remediation progress imaging permeable channels and fractures |
| enhancing removal/pumping efficiency | |

Liquid Control

General Liquid Guidance

The controlled emplacement of liquids in order to treat or contain contaminants in the subsurface is a critical problem in all aspects of in situ remediation. Failure to properly emplace liquid invariably leads to failure of the remediation method, regardless of its other merits or elegance. Current emplacement practices for subsurface treatment consist entirely of injection, and the mechanism for fluid guidance is pressure (potential) differentials. This is a "brute-force" approach, which is commonly inefficient and unpredictable, because it is subject to short-circuiting by high permeability zones. The ferrofluid-based approach described herein alleviates the adverse effects of heterogeneity and leads to more accurate and effective technologies for targeting and delivery of reactants or other liquids to contaminated zones in the subsurface.

The concept of using ferrofluids to target specific areas in the subsurface avoids the diffusive injection process (which may result in an unpredictable final distribution due to heterogeneity in the hydraulic properties) in favor of a magnetic process.

In essence, the concept is to use magnetic fields due to either permanent or electromagnets to attract ferrofluids to a desired location. As the ferrofluid migrates toward the magnet, the liquid can be used to sweep a predefined region. As the fluid gathers around the magnet, it will form a subspherical bulb whose shape and volume can be imaged. Magnetic fields are easier to manipulate than pressure fields and are unaffected by the significant heterogeneity of the soil hydraulic properties. Soil magnetic properties exhibit almost negligible heterogeneities (i.e., a few percentage points) compared to the hydraulic conductivity variations of the same soils, which routinely span several orders of magnitude. In essence, there is no equivalent (in the magnetic property distribution) to the fast pathways often encountered in the subsurface. The fumdamental difference between conventional injection and magnetically controlled emplacement is that injection can only be controlled at the injection point, while a ferrofluid emplacement can be controlled at the target point. This approach allows fluids to be focused and guided to the desired locations in the subsurface, and more effectively sweep the targeted treatment zone.

The following Examples illustrate the various embodiments of the process of the invention.

EXAMPLE 1

Figure 2:
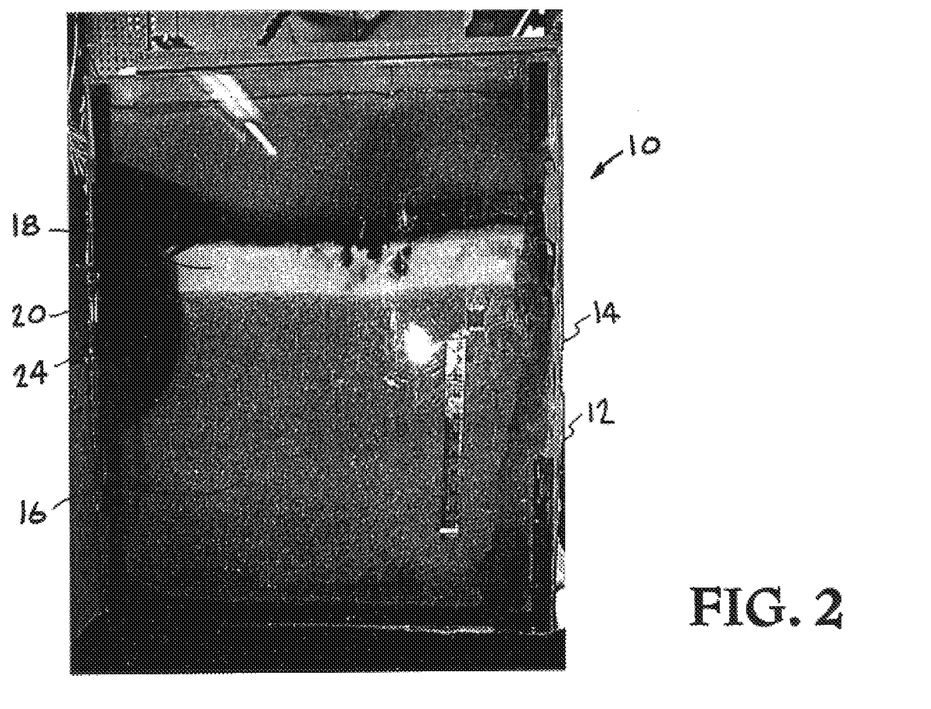
FIG. 2. Picture showing the flow of EMG 805 ferrofluid through layered sands, and accumulation against a permanent magnet.

Shown in FIG. 2 is an experiment illustrating several points relevant to the process of guiding liquids in the subsurface. Details can be found in Borglin et al., 1998a, incorporated herein by reference. The figure, actually a photograph, shows a vertically oriented cell 10 bounded by two glass plates 12,14 filled with coarse sand 16 with a fine grained sand lens 18 that shows up in FIG. 2 as a white band relative to the gray coarse sand. On the left-hand side of the cell is a strong permanent magnet 20 ($B_r$=1.2 T).

This magnet was obtained from Pacific Century Enterprises, Centreville, Va., and is sold under the trade name Pacimax 38. A quantity of ferrofluid (EMG 805, sold by the Ferrofluidics Corporation, Nashua, N.H.) was introduced along the top of the cell. Over a period of 12 hours, the ferrofluid migrated to the left along the top of the fine sand layer toward the magnet, defying the considerable downward gravitational pull arising from the 190 kg m$^{-3}$ density difference.

This example demonstrates the guiding of ferrofluid to effect a liquid sweeping of the subsurface. Although the fine sand has lower permeability than the coarse sand, the ferrofluid has formed a subspherical bulb 24 around the magnet 20. Despite the dark color above the fine sand, approximately 90% of the ferrofluid has gathered around the magnet after 12 hours. Thus, despite the pull of gravity and the low permeability fine sand layer, the ferrofluid ends up in a final static configuration around the magnet, in the shape of a spherical bulb. Furthermore, this final steady-state configuration is symmetric, and controlled only by the magnetic field. This example demonstrates that ferrofluids and magnetic fields can be used to precisely target a region of the subsurface for liquid emplacement.

Through this novel method of emplacement, ferrofluids can be used to enhance the efficiency of in situ treatment and waste containment through (a) accurate guidance and delivery of reagent liquids to the desired subsurface contamination targets, (b) effective sweeping of the contaminated zone as ferrofluids move from the application point to an attracting magnet/collection point, and (c) enhanced efficiency of liquid removal by magnetic concentration around the point of extraction. The ferrofluids to be used in applications will have the appropriate carrier liquids, containing reactants (e.g. oxidants) for in situ treatment of contaminants and barrier liquids (such as polysiloxanes or colloidal silica) for containment. These applications will be discussed separately below. Simply put, ferrofluid attraction toward a magnet in the subsurface is a self-contained displacement process that does not require any fluid to be pumped to the surface, thus eliminating all of the cost and risk of surface liquid disposal.

EXAMPLE 2

A plurality of boreholes, three inches in diameter, and spaced apart about fifty centimeters, from center axis to center axis, are drilled into the ground to a depth of approximately twenty feet, adjacent to a known pool of heavy metal (nickel, uranium, and plutonium) contaminants. In each of the boreholes is injected a quantity of ferrofluid, a solution of magnetite particles suspended in a reactive liquid carrier, such as pyrogallol. Pyrogallol can be obtained from the DuPont Corporation, Wilmington, Del. The reactive carrier component of the ferrofluid is known to be capable of reacting with and neutralizing the contaminants in the ground. Subsequent to the injection of the ferrofluid into the ground, and after sufficient time has passed to enable the carrier to react with the contaminants in the ground (about ten days), a magnet (1.4 tesla, obtained from Magnetic Component Engineering, Inc., Torrance, Calif. and sold under the name N4862) is placed in the bottom of each of the boreholes, thereby drawing the ferrofluid and neutralized contaminants towards the magnet. A subspherical shaped bulb is formed. The bulb containing the neutralized contaminants is then removed from the subsurface through the boreholes previously drilled.

Alternatively, the ferrofluid is left in the ground, with the neutralized contaminants surrounding the magnet.

In the foregoing Example, each bulb formed of neutralized contaminants plus ferrofluid extends approximately 30 centimeters from the site of the magnet in a spherical configuration.

If it is found that upon removal of the magnet and the ferrofluid containing bulb surrounding it, all of the contaminants have not been removed, a new magnet is then placed in the borehole, additional reactive ferrofluid injected, and the process repeated.

Any type of magnet can be used for insertion into the borehole. The preferred magnets are permanent magnets, made of sintered Neodymium Iron Boron (NdFeB), however, superconducting magnets can also be used, or conventional electromagnets. Suitable NdFeB magnets can be obtained from the Magnetic Component Engineering Corp., Torrance, Calif. Neodymium Iron Boron magnets are a type of rare earth alloy that typically has two atoms of Neodymium, (Nd), 14 atoms of Iron (Fe), and one atom of Boron (B) as the primary elements.

Whatever type of magnet is used, the magnetic flux density should be within the range of 1 to 1.8 Tesla, with the preferred range being from about 1.2 to about 1.6 Tesla.

Corrosion resistance is obtained by coating the magnets with phenolic resin, before placing them in the boreholes.

EXAMPLE 3

The targeting of ferrofluids can be used to seal underground tanks in both the saturated and the unsaturated zone. If a tank can be induced to behave magnetically, a very effective sealing is possible because the injected ferrofluids have been found to accumulate against it in response to the tank magnetic field. In this application, Ferrofluid Barrier Liquids (FBLs), a new generation of barrier liquids, can be used. The carrier liquids of FBLs are members of the current generation of barrier materials used in the Viscous Liquid Barrier (VLB) technology (U.S. Pat. No. 5,836,390; Moridis et al, 1995), i.e., Colloidal Silica (EKA Chemicals, Atlanta, Ga.) and Polysiloxanes (Dow Corning Corp., Midland Mich.). This patent is incorporated herein by reference. In this technology, the barrier liquids solidify after injection to form a solid barrier against contaminants.

Two general types of barrier liquids have been used as the carriers for the magnetite particles. The first is Colloidal Silica (CS), an aqueous suspension of silica microspheres in a stabilizing electrolyte. The increase in viscosity of the CS following injection is due to a controlled gelation process induced by the presence of a neutralizing agent or a concentrated salt solution, either one of which is added immediately prior to injection at ambient temperatures.

The second type belongs to the polysiloxane family (PSX), and involves vinyl-terminated silanes with dimethyl side groups. The increase in viscosity in PSX is caused by the cross linkage of the injected substances and the formation of a matrix of essentially infinite viscosity after the addition of a catalyst through a process akin to vulcanization. The cross-linking process is controlled by the quantities of the catalyst, crosslinker, and (occasionally) retardant added to the PSX prior to injection.

The preferred polysiloxanes for use in this embodiment of the invention are sold by the Dow Corning Corporation, Midland Mich., under the trade name (2-7154-PSX-10).

The preferred colloidal silicas include those sold under the names Nyacol 1440 and Nyacol DP5110, by the Eka-Nobel co. Marietta, Ga. Nyacol 1440 is an alkaline colloid which can be jelled by the addition of NaCl brine, while Nyacol DP5110 is a alumina-modified colloid which can be jelled by the addition of $CaCl_2$ brine.

Figure 3:
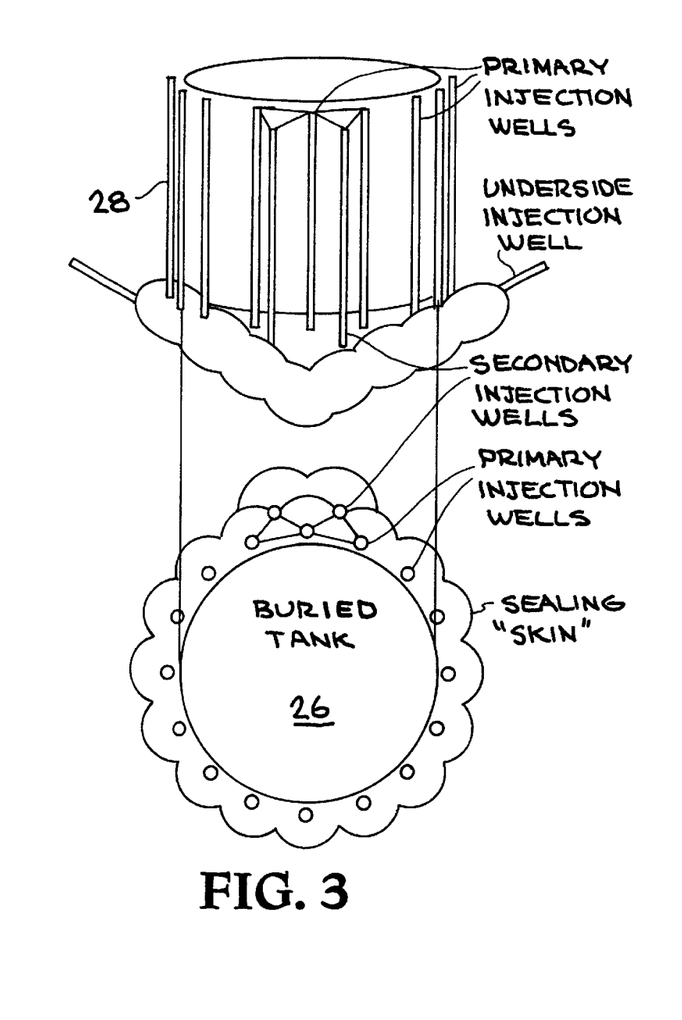
FIG. 3. Schematic of the technology for buried tank sealing.

A schematic of the tank sealing embodiment of the invention is shown in FIG. 3, in which probes for primary and secondary injection are identified. Ferrofluid Barrier Liquids (FBL), which are made by mixing ferromagnetic material with carrier liquids, such as the aforementioned polysiloxanes or colloidal silica, are injected in the immediate vicinity of an underground steel tank 26 through specially designed probes 28 (closely spaced and fitted with magnets and injection ports, not shown) accumulate against the magnets and the induced (secondary) magnetic field of the steel tank. The strong magnets located in the probes magnetize the steel tank walls, and allow the FBL to coat the tank. The ferrofluid coating seals and stabilizes the tank, eliminating concerns over the effectiveness and potential shortcomings such as galvanic degradation and/or corrosion-related cracking at welds and join interfaces, while minimizing site disturbance and exposure risk.

Figure 4:
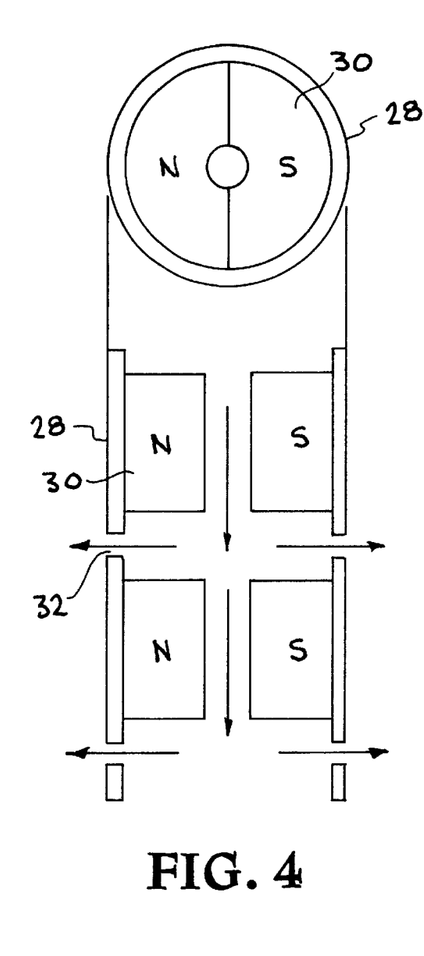
FIG. 4. Configuration of permanent magnets and injection ports in the probes.

A design of the probe 28, showing a possible arrangement of the permanent magnets 30 and of the injection ports 32, is shown in FIG. 4.

To seal the tank bottom, two different approaches can be used. If the tank conditions permit lowering the magnets to the bottom of the tank, then FBLs injected underneath the tanks will accumulate against the bottom in response to the magnetic field and will seal it. If the inside of the tank is inaccessible, then the underside of the tank can be sealed by using the viscous liquid barrier (VLB) technology (see U.S. Pat. No. 5,836,390) using barrier liquids (BLs) matching the carrier liquids in the FBLs. Thus, maximum compatibility of the sealing materials is ensured.

EXAMPLE 4

A cylindrical underground tank (approximately 75 feet in diameter, by 30 feet high) containing nuclear contaminants is identified. A plurality of boreholes (3 inches in diameter) are drilled into the soil surrounding the external periphery of the tank. A ferrofluid solution comprising a colloidal silica carrier liquid, such as is described and claimed in U.S. Pat. No. 5,836,390, and magnetite particles in suspension, is then injected into the boreholes. Magnets (N4862, 1.4 tesla, obtained from Magnetic Component Engineering, Inc., Torrance, Calif.), are then placed in the bottoms of the boreholes. They set up a secondary magnetic field in the tank, thus the tank itself becomes magnetized. The ferrofluid solution migrates toward the tank. Thereafter, a plurality of secondary injection wells are drilled in a concentric circle surrounding the first series of wells. Into the secondary injection wells is injected more of the ferrofluid solution described above. After injection into the secondary injection wells, the film-forming material is drawn to the buried tank as a consequence of it being a secondary magnet, and the colloidal silica then solidifies and forms a film surrounding the tank.

A polysiloxane carrier liquid can be used instead of colloidal silica in the above example with substantially equivalent results.

Figure 5:
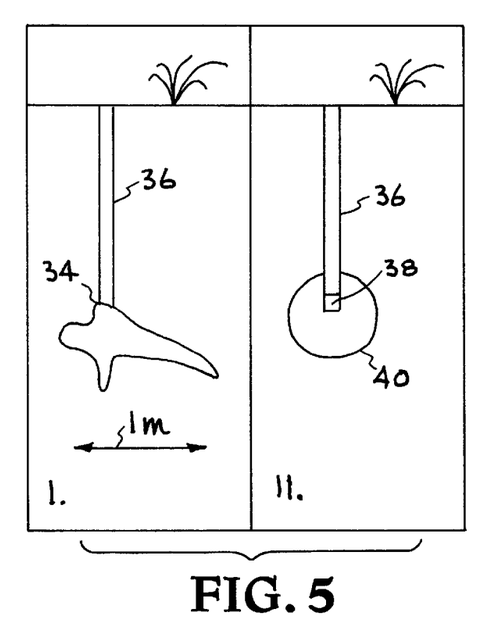
FIG. 5. Schematic for forming a subspherical bulb for a subsurface barrier using ferrofluid based liquids (FBL)'s.

For the subsurface containment of contaminants, VLB technology has shown great promise. A limitation of the current technology is the difficulty of controlling the individual injections that are part of the series of closely spaced and overlapping injections needed to create a subsurface barrier. In particular, conventional injection will usually result in the barrier liquid moving through the most permeable pathway rather than creating controllable shapes upon which the barrier must be based. Ferrofluid-based Barrier Liquids (FBLs) have the potential to create subspherical bulbs that can be emplaced on spacings that ensure their coalescence. The process is shown schematically in FIG. 5. The process consists of conventional injection of FBLs at a point 34 in a borehole 36 (Frame I), and then the immediate insertion of a magnet 38 into the hole near the injection point. The magnet draws back the FBL from wherever the initial injection sent it. After some time, the FBL forms a subspherical bulb 40 around the magnet (Frame II). Subsequent injections above, below, and on the sides are made after gelling of the FBL in order to create a coalescence of the bulbs, thereby forming a contiguous barrier.

It has been observed in numerous laboratory experiments (Borglin et al., 1 998a, incorporated herein by reference) that final bulb shape is controlled by a balance between gravity and magnetic forces, independent of the local permeability field and the initial distribution of ferrofluid solution, provided the ferrofluid is not too far away from the magnet.

EXAMPLE 5

A series of boreholes (3 inches in diameter) aligned in a straight line are drilled in an area where contamination is sought to be restrained. Into each of the boreholes is injected a quantity of ferrofluid-based barrier liquid which disseminates into the porosity of the subsurface. Thereafter, a magnet (N4862, 1.4 tesla, obtained from the Magnetic Component Engineering Corp., Torrance, Calif.) is inserted into each of the boreholes and lowered to the bottom thereof. Each magnet draws to it a quantity of the ferrofluid-based barrier liquid, forming a subspherical bulb at the base of each borehole. Each bulb comes into contact with the bulb of the adjacent borehole, thereby forming a barrier against movement of liquid contaminants in the ground.

The diameter of the subspherical bulbs averages about 50 centimeters. Each borehole is spaced apart from the adjacent one by about 30 centimeters, center axis to center axis.

The magnets have a tesla value of 1.4. Magnets of other values can be used depending on the spacings of the boreholes and other considerations, such as formation permeability.

The basic criteria is that the magnets have sufficient flux density to attract the ferromagnetic particles in the ferrofluid solutions to them. This will vary depending on a number of environmental conditions.

Figure 6:
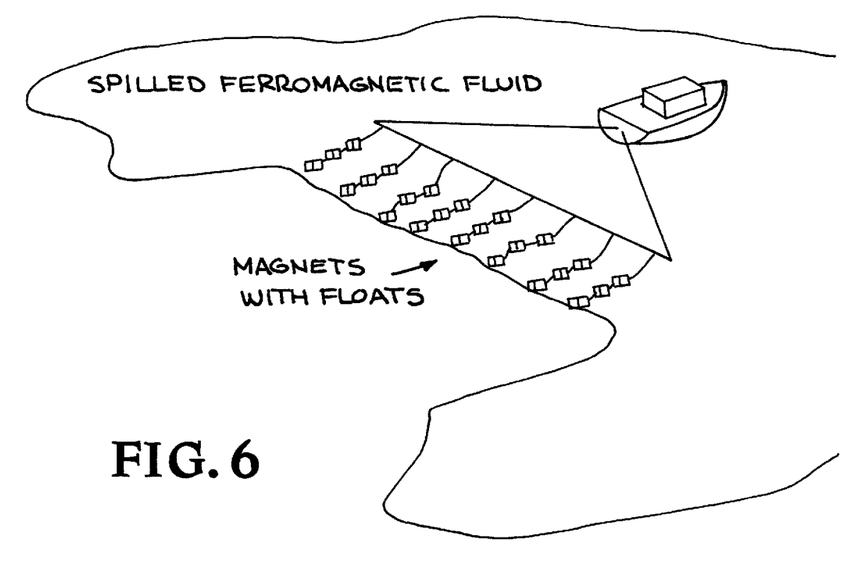
FIG. 6. Schematic for the use of ferrofluid to ensure cleanup in the case of spillage.

Because ferrofluid solutions can be made utilizing a variety of carrier liquids, they can be designed for use in conjunction with various petrochemical liquids that are currently transported by barges and tankers over the seas, on rails, and on roads. If a hazardous liquid such as benzene, being transported by tanker over the sea, were to be spilled into the water, it would create a difficult spill to clean up. Benzene can be combined with colloidal magnetite particles and a dispersant, to create a benzene-based ferrofluid. If the benzene based ferrofluid were spilled during transport in water, magnets can be deployed to gather the spilled liquid/ferrofluid solution and remove it from the sea (FIG. 6). Upon safe arrival at the intended destination, the ferrofluid components can be separated from the benzene by adding a flocculating agent and magnetically separating the magnetite particles. This approach also aids terrestrial spills, and has application to the transport of liquefied Hanford tank sludge, a mix of radionuclides and organic wastes.

This process is illustrated in the following example.

EXAMPLE 6

Several gallons of benzene based ferrofluid are spilled onto the surface of the ocean. Thereafter, magnets are dragged along the surface of the seawater through that area in which the benzene was spilled, and the benzene based ferrofluid accumulates around the magnet. The magnet is then raised out of the water, and the benzene/ferrofluid solution is stripped from the magnet either by demagnetizing the magnet or physically separating it. The magnet is then again dragged through the spilled benzene/ferrofluid solution until the desired amount of recovery is achieved.

In general, the removal by pumping of liquid in the saturated zone can be made more efficient through the use of ferrofluids and a magnet to concentrate the target fluid prior to pumping. This general concept will be illustrated here through its application in enhancing the existing cosolvent sweep nonaqueous phase liquid (NAPL) remediation method. The cosolvent sweep method involves the injection of cosolvents that solubilize NAPLs and are themselves miscible in water. The advantages of the method are that (1) NAPL mobility is enhanced by interaction with the cosolvent making it possible to -remove the mixture by pumping, (2) cosolvent can be injected into a general area without knowledge of the exact locations of the NAPL, and (3) cosolvents such as ethanol are readily available and inexpensive. The main problems with the method are that (1) mobilized NAPL may migrate uncontrollably downward and laterally creating a greater contamination problem than initially present, and (2) extracting the cosolvent-NAPL mixture requires traditional pumping that is invariably controlled by the local permeability field and therefore results in the production of large amounts of groundwater that must be treated and disposed of.

The use of ferrofluids in cosolvent floods can alleviate the main problems of cosolvent flooding. A Ferrofluid for Cosolvent Sweeping (FCS) is a ferrofluid that uses a cosolvent (e.g., ethanol) as the carrier liquid. This FCS will be (1) miscible with both water and NAPL, (2) magnetically active, and (3) imageable by geophysical methods. In conjunction with the emplacement of strong magnets, ferrofluid-enhanced cosolvent sweeping can decrease uncontrolled migration of cosolvent-NAPL mixture, increase the efficiency of extraction of the cosolvent-NAPL mixture, and allow geophysical monitoring of the process. These issues are discussed below.

Figure 7:
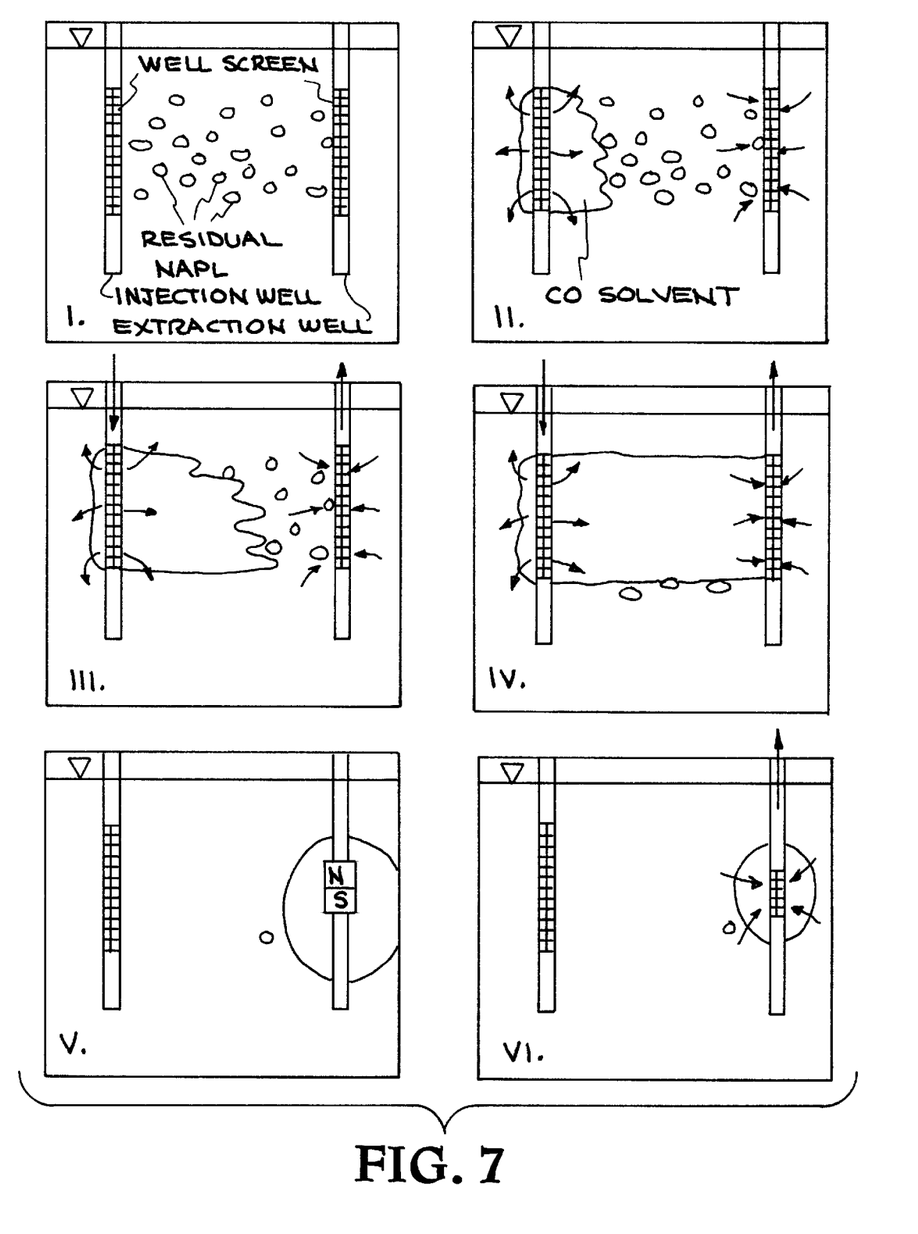
FIG. 7. Schematic of the ferrofluid-enhanced sweep for non aqueous phase liquids (NAPL) remediation.

Shown below in FIG. 7 is a two-dimensional schematic of a cosolvent sweep NAPL remediation. In FIG. 7, frame I shows the initial distribution of NAPL and the injection and extraction wells which are screened over the height of the contaminated region. Frame II shows the injection of cosolvent and the production of water from the system. In frame II, the flushing is effectively solubilizing NAPL while the pumping draws the cosolvent through the contaminated region, producing large amounts of groundwater from the noncontaminated (right-hand) side of the well. In the frame IV, the cosolvent sweep has removed most of the NAPL, while some NAPL becomes mobile without strongly dissolving into the cosolvent. This mobile NAPL may escape the pumping well and travel farther down into the aquifer. Removing all of the cosolvent-NAPL mixture after injection of cosolvent is stopped is extremely difficult and requires pumping large volumes of water from the extraction well. Frames I–IV illustrate the problems of (1) production of large amounts of liquid from the subsurface, and (2) mobilization and migration of NAPL.

Frames V and VI show a schematic for a ferrofluid-enhanced cosolvent sweep. The process begins the same as for the standard method, therefore frames I–IV are applicable except that the cosolvent is a FCS. After some period of time in the sweep phase of frame IV, the injection of cosolvent is terminated along with the extraction. As shown in Frame V, a strong permanent magnet is placed down the extraction well at an intermediate height in the contaminated region. Over time, the ferrofluid-cosolvent-NAPL mixture is drawn toward the magnet by magnetic force. This process creates a radially symmetric bulb of ferrofluid-cosolvent balanced by magnetic forces and gravity independent of the local permeability. The progress of attraction and the shape of the bulb can be monitored by geophysical methods due to the strong magnetic and electrical resistivity anomaly created by the ferrofluid cosolvent. After sufficient time, a reduced well-screen interval can be used to efficiently extract the collected fluid bulb without the need to extract unwanted groundwater (Frame VI). In summary, the ferrofluid-enhanced cosolvent sweep improves the standard cosolvent NAPL remediation process by concentrating the ferrofluid-cosolvent NAPL mixture around the point of extraction prior to pumping.

EXAMPLE 7

A series of boreholes (3 inches in diameter) are made into the ground in the vicinity of a quantity of naphtha. The naphtha is mixed in with water, and thus impossible to recover economically. Into each of the boreholes is pumped a quantity of FCS, which is miscible in the naphtha. Subsequently, a 1.4 tesla magnet (Magnetic Component Engineering, Torrance, Calif.) is inserted into the bottom of each borehole, and draws around it the now organic solution of naphtha/alcohol/ferrofluid, forming a subspherical bulb. The bulb is pumped to the surface, and the constituents separated from each other.

Subsurface Imaging
General Subsurface Fluid Imaging

Figure 8:
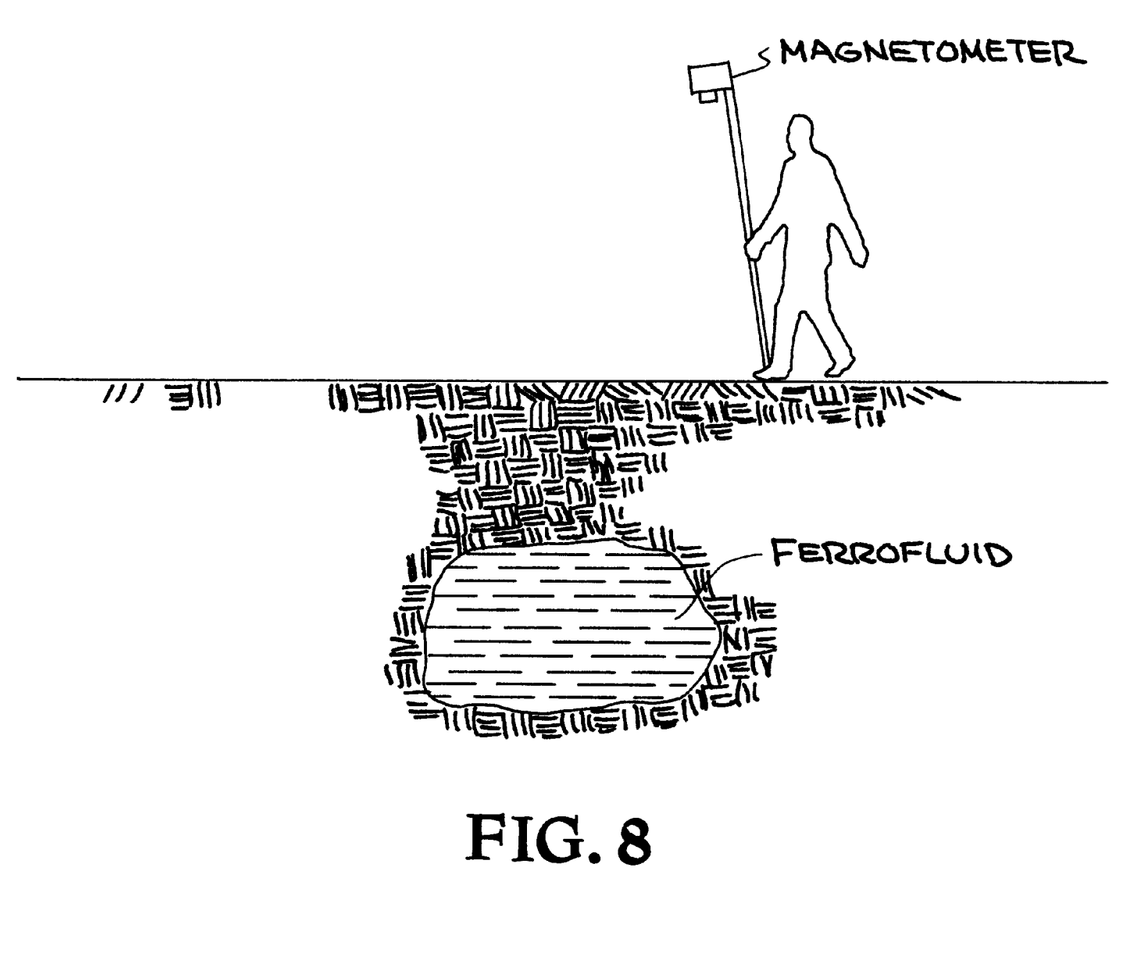
FIG. 8. Schematic of geophysical imaging of ferrofluid at depth.

The magnetic particles in ferrofluids create a magnetic and electrical resistance anomaly in the subsurface relative to typical sediments, soils, and rock. The high saturation magnetization of ferrofluids is sufficiently strong for traditional magnetic detection methods even at the low loading volumes (1–5% magnetite by volume) typical of ferrofluids. We have developed a process for real-time monitoring of fluid movement and position during injection using magnetic and electromagnetic (EM) geophysical imaging methods. The basic schematic for subsurface ferrofluid imaging is shown in FIG. 8, which is relevant to each of the specific applications for environmental engineering presented below.

Ferrofluids can provide a significant leak detection and barrier verification tool for subsurface containment technologies. For example, in the scenario where FBLs are used to create subsurface barriers, these barriers can be imaged by magnetic and EM methods to check for barrier geometry, extent, and continuity. These geophysical methods can be performed at the surface or downhole as appropriate based on the depth and geometry of the barrier in question. Where traditional VLB technology has been used, ferrofluids can be used as tracers to test the effectiveness of the barrier. For example, a strong magnet can be used to create an attractive force on some injected ferrofluid on the opposite side of a VLB. Through magnetic and EM methods, one can monitor the barrier for evidence of ferrofluid migrating through the barrier and thereby assess the integrity of the barrier.

In the case where the spilled liquid is itself a ferrofluid, the progress of removal of the contaminated liquid can be detected and imaged by magnetic and EM methods. For example Hanford tank sludge can be mixed with ferrofluid for the sluicing of the Hanford tanks. Because of the existing leaks in the floor and walls of the tank, some fraction of the sluiced liquid will escape through the bottom. During pumping of the ferromagnetic sludge, a process that can itself be enhanced by the application of strong magnetic fields to draw the fluid to the point of extraction prior to pumping, the progress of contaminant extraction can be monitored through geophysically imaging the extent of the ferromagnetic liquid. The cleanup can be verified by showing no significant magnetic or resistivity anomaly.

In general, the magnetic and electrical resistivity properties of ferrofluids and the well established magnetic and EM geophysical imaging methods make them applicable to general fluid flow tracing as may be relevant for detecting preferential flow features (such as fractures) in the subsurface, and thus aid in site characterization and the design of more effective remediation systems. Consider the case of a contaminated subsurface site where fracture flow dominates over matrix flow and creates fast-flow paths that limit the effectiveness of a pump and treat system. By injecting ferrofluid and imaging fast-flow paths, subsequent extraction well placement can be designed to avoid the detrimental effects of the fast-flow path. Any subsurface feature that can hold ferrofluid, be it a fracture, a permeable channel, or a clay lens, can be imaged by this method. Combined with traditional tracer test methods where breakthrough curves are measured at extraction wells, the use of ferrofluids as geophysically imageable tracers finds a wealth of applications in environmental engineering.

EXAMPLE 8

A series of boreholes (3 inches in diameter) are made in the ground in the vicinity of subsurface contamination by trichloroethylene (TCE). Ferrofluid (EMG 805) is injected into the boreholes screened over a large distance. The ferrofluid flows in the preferential flow paths.

On the surface, a magnetometer is passed over the area of contamination, and the magnetic profile of the ferrofluids is read on the magnetometer, thereby providing the individual on the surface with a precise knowledge of where and how far the contamination has extended underneath the ground. Surface imaging of the subsurface ferrofluid can also be used to detect leaks in barriers and assess the integrity of the barrier.

It will be recognized by those skilled in the art that various modifications can be made in the processes described above without departing from the spirit and scope of the attached claims.

What is claimed is:

1. A method of subsurface barrier emplacement which comprises the steps of: 1) injecting a ferrofluid based barrier liquid into the ground at a predetermined point in a plurality of spaced apart boreholes, and 2) inserting a magnet in to each of said boreholes near the injection point of said barrier liquid, said magnet having sufficient magnetic power as to attract said ferrofluid-based barrier liquid, whereby the magnet will draw back said barrier liquid from the area surrounding said initial injection site, thus forming a subspherical bulb around each magnet, which bulb in turn forms a contiguous barrier with abutting bulbs surrounding magnets in adjacent boreholes.

2. The process of claim 1 wherein said ferrofluid comprises magnetic particles suspended in oil stabilized by dispersants, and having a saturation magnetization value ranging from about 0.01 to about 0.06 tesla.

3. The process of claim 1 wherein said ferrofluid comprises magnetic particles suspended in water, stabilized by dispersants, and having a saturation magnetization value ranging from about 0.01 to about 0.02 tesla.

4. The process of claim 1 wherein said magnets have a tesla value ranging from about 1 to about 2 tesla.

5. The process of claim 1 wherein said barrier liquid comprises colloidal silica or polysiloxanes.

6. The process of claim 5 wherein said barrier liquid comprises colloidal silica.

7. The process of claim 5 wherein said barrier liquid comprises a polysiloxane.

\* \* \* \* \*